United States Patent
Klein

(10) Patent No.: US 7,376,079 B2
(45) Date of Patent: May 20, 2008

(54) BACKUP CELL CONTROLLER

(75) Inventor: John Klein, Morgan Hill, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 798 days.

(21) Appl. No.: 10/856,156

(22) Filed: May 28, 2004

(65) Prior Publication Data
US 2005/0028032 A1 Feb. 3, 2005

Related U.S. Application Data

(60) Provisional application No. 60/473,756, filed on May 28, 2003.

(51) Int. Cl.
*H04L 1/00* (2006.01)
(52) U.S. Cl. ........................ 370/226; 370/243; 370/246
(58) Field of Classification Search ...................... None
See application file for complete search history.

(56) References Cited

U.S. PATENT DOCUMENTS

| | | | |
|---|---|---|---|
| 5,239,673 A | 8/1993 | Natarajan | |
| 5,339,316 A | 8/1994 | Diepstraten | |
| 5,371,738 A | 12/1994 | Moelard et al. | |
| 5,432,814 A | 7/1995 | Hasegawa | |
| 5,457,557 A | 10/1995 | Zarem et al. | |
| 5,461,627 A | 10/1995 | Rypinski | |
| 5,465,392 A | 11/1995 | Baptist et al. | |
| 5,490,130 A | 2/1996 | Akagiri | |
| 5,502,726 A | 3/1996 | Fischer | |
| 5,504,746 A | 4/1996 | Meier | |
| 5,506,887 A | 4/1996 | Emery et al. | |
| 5,546,397 A | 8/1996 | Mahaney | |
| 5,602,843 A | 2/1997 | Gray | |
| 5,610,972 A | 3/1997 | Emery et al. | |
| 5,623,495 A | 4/1997 | Eng et al. | |

(Continued)

FOREIGN PATENT DOCUMENTS

EP 0566874 10/1993

(Continued)

OTHER PUBLICATIONS

Bahl et al, The CHOICE Network: Broadband Wireless Internet Access In Public Places, downloadable in Microsoft site, pp. 1-13, Feb. 2000.*

(Continued)

*Primary Examiner*—Frank Duong
(74) *Attorney, Agent, or Firm*—Ingrassia Fisher & Lorenz, P.C.

(57) ABSTRACT

A wireless local area network for data communications between a computer and mobile units is provided with at least two cell controllers connected to the computer and one or more rf ports each connected to a primary interface of one cell controller and to a backup interface of another cell controller. A control program in the cell controller monitors data communications between the other cell controller and the rf port by a backup interface. The program is arranged to cause the second cell controller to assume primary communications functions for the rf port in the event primary communications functions between a first cell controller and the rf port are inoperative.

14 Claims, 1 Drawing Sheet

U.S. PATENT DOCUMENTS

| | | |
|---|---|---|
| 5,636,220 A | 6/1997 | Vook et al. |
| 5,668,803 A | 9/1997 | Tymes et al. |
| 5,717,737 A | 2/1998 | Doviak et al. |
| 5,734,963 A | 3/1998 | Fitzgerald et al. |
| 5,737,328 A | 4/1998 | Norman et al. |
| 5,758,281 A | 5/1998 | Emery et al. |
| 5,761,619 A | 6/1998 | Danne et al. |
| 5,765,112 A | 6/1998 | Fitzgerald et al. |
| 5,768,531 A | 6/1998 | Lin |
| 5,771,353 A | 6/1998 | Eggleston et al. |
| 5,796,729 A | 8/1998 | Greaney et al. |
| 5,835,696 A | 11/1998 | Hess |
| 5,850,526 A | 12/1998 | Chou |
| 5,852,405 A | 12/1998 | Yoneda et al. |
| 5,870,385 A | 2/1999 | Ahmadi et al. |
| 5,873,085 A | 2/1999 | Enoki et al. |
| 5,875,186 A | 2/1999 | Belanger et al. |
| 5,881,094 A | 3/1999 | Schilling |
| 5,889,816 A | 3/1999 | Agrawal et al. |
| 5,901,362 A | 5/1999 | Cheung et al. |
| 5,907,544 A | 5/1999 | Rypinski |
| 5,918,181 A | 6/1999 | Foster et al. |
| 5,946,617 A | 8/1999 | Portaro et al. |
| 5,958,006 A | 9/1999 | Eggleston et al. |
| 5,960,344 A | 9/1999 | Mahaney |
| 5,974,034 A | 10/1999 | Chin et al. |
| 5,991,287 A | 11/1999 | Diepstraten |
| 5,999,295 A | 12/1999 | Vowell et al. |
| 6,005,884 A | 12/1999 | Cook et al. |
| 6,006,090 A | 12/1999 | Coleman et al. |
| 6,011,975 A | 1/2000 | Emery et al. |
| H1836 H | 2/2000 | Fletcher et al. |
| 6,031,863 A | 2/2000 | Jusa et al. |
| 6,067,291 A | 5/2000 | Kamerman et al. |
| 6,088,346 A | 7/2000 | Du et al. |
| 6,101,531 A | 8/2000 | Eggleston et al. |
| 6,119,162 A | 9/2000 | Li et al. |
| 6,137,797 A | 10/2000 | Bass et al. |
| 6,140,911 A | 10/2000 | Fisher et al. |
| 6,154,461 A | 11/2000 | Sturniolo et al. |
| 6,205,495 B1 | 3/2001 | Gilbert et al. |
| 6,213,942 B1 | 4/2001 | Flach et al. |
| 6,259,898 B1 | 7/2001 | Lewis |
| 6,272,120 B1 | 8/2001 | Alexander |
| 6,301,618 B1 | 10/2001 | Sitaraman et al. |
| 6,330,231 B1 | 12/2001 | Bi |
| 6,330,244 B1 | 12/2001 | Swartz et al. |
| 6,353,599 B1 | 3/2002 | Bi et al. |
| 6,359,873 B1 | 3/2002 | Kobayashi |
| 6,393,261 B1 | 5/2002 | Lewis |
| 6,400,722 B1 | 6/2002 | Chuah et al. |
| 6,414,950 B1 | 7/2002 | Rai et al. |
| 6,415,323 B1 | 7/2002 | McCanne et al. |
| 6,473,449 B1 | 10/2002 | Cafarella et al. |
| 6,487,605 B1 | 11/2002 | Leung |
| 6,496,499 B1 | 12/2002 | Hamilton et al. |
| 6,496,881 B1 | 12/2002 | Green et al. |
| 6,512,754 B2 | 1/2003 | Feder et al. |
| 6,590,884 B1 | 7/2003 | Panasik |
| 6,590,885 B1 | 7/2003 | Jorgensen |
| 6,629,151 B1 | 9/2003 | Bahl |
| 6,665,536 B1 | 12/2003 | Mahany |
| 6,681,259 B1 | 1/2004 | Lemilainen et al. |
| 6,701,361 B1 | 3/2004 | Meier |
| 6,717,926 B1 | 4/2004 | Deboille et al. |
| 6,724,730 B1 | 4/2004 | Mlinarsky et al. |
| 6,751,250 B2 | 6/2004 | Kirke et al. |
| 6,760,859 B1 | 7/2004 | Kim et al. |
| 7,042,988 B2 * | 5/2006 | Juitt et al. ............... 379/88.17 |
| 2001/0055283 A1 | 12/2001 | Beach |
| 2002/0015398 A1 | 2/2002 | Kikinis |
| 2002/0034168 A1 | 3/2002 | Swartz et al. |
| 2002/0089958 A1 | 7/2002 | Feder et al. |
| 2002/0099972 A1 | 7/2002 | Walsh et al. |
| 2002/0115442 A1 | 8/2002 | Dorenbosch et al. |
| 2002/0181429 A1 | 12/2002 | Kikinis |
| 2002/0196763 A1 | 12/2002 | Reynolds et al. |
| 2003/0012164 A1 | 1/2003 | Mizoguchi et al. |
| 2003/0105865 A1 | 6/2003 | McCanne et al. |
| 2003/0112820 A1 | 6/2003 | Beach |
| 2003/0193946 A1 | 10/2003 | Gernert et al. |
| 2004/0029612 A1 | 2/2004 | Gorsuch |
| 2005/0157690 A1 | 7/2005 | Frank et al. |
| 2005/0226181 A1 | 10/2005 | Beach |

FOREIGN PATENT DOCUMENTS

| | | |
|---|---|---|
| EP | 0696117 | 2/1996 |
| EP | 0817096 | 1/1998 |
| EP | 1134935 | 9/2001 |
| GB | 2 320 647 | 6/1998 |
| WO | WO 93/07684 | 4/1993 |
| WO | WO 95/05720 | 2/1995 |
| WO | WO 96/23377 | 1/1996 |
| WO | WO 97/21316 | 6/1997 |
| WO | WO 97/29602 | 8/1997 |
| WO | WO 99/37047 | 7/1999 |
| WO | WO 00/24216 | 4/2000 |
| WO | WO 01/43467 | 6/2001 |
| WO | WO 2004/107638 | 12/2004 |

OTHER PUBLICATIONS

Supplementary European Search Report for PCT/US2004/017199.

Proxim, Inc., White Paper, "What is a Wireless LAN".

Shankaranarayanan N K et al. "Multiport Wireless Acess System Using Fiber/Coax Networks for Personal Communications Services (PCS) and Subscriber Loop Applications," Global Telecommunications Conference 1995. Conference Record. Communication Theory Mini-Conference,Globecom '95., IEEE Singapore Nov. 13-17, 1995, New York, New York, USA, IEEE, US, Nov. 13, 1995, pp. 977-981, XP010164519.

Rypinski, Chandos "Motivation for Centralized LAN Functions," Personal, Indoor and Mobile Radio Communications, 1992. Proceedings, PIMRC '92, Third IEEE International Symposium on Boston, MA, USA Oct. 19-21, 1992, New York, NY, USA, IEEE, US, Oct. 19, 1992, pp. 153-158, ISBN: 0-7803-0841-7.

* cited by examiner

BACKUP CELL CONTROLLER

CROSS-REFERENCE TO RELATED APPLICATION

This application claims the benefit of U.S. provisional patent application Ser. No. 60/473,756, filed on May 28, 2003.

BACKGROUND OF THE INVENTION

This invention relates to wireless data communications networks, and in particular to such networks in accordance with co-assigned and co-pending U.S. patent application Ser. No. 09/528,697, filed Mar. 17, 2000, which is hereby incorporated by reference herein its entirety.

U.S. patent application Ser. No. 09/528,697 discloses an arrangement for wireless local area networks, and particularly arrangement for wireless networks using the radio data communications protocol of IEEE Standard 802.11, such as the Spectrum 24 system which is available from the assignee of this application. In the referenced prior application there is disclosed an arrangement wherein access points used for a conventional IEEE Standard 802.11 wireless data communication system are replaced by simplified devices called "rf ports" in the prior application. The rf ports are connected by an interface to cell controllers which are computers programmed to perform much of the higher level MAC functions required of an access point according to Standard 802.11. As indicated in the referenced prior application, the rf ports can be simplified devices which are supplied with power over the data communications cable from the location of the cell controller. Accordingly the rf ports provide a simplified device, not only for manufacture, but also for installation.

One consideration with the arrangements as described in the referenced prior application is that a failure of a cell controller can result in a failure of communications between a wired network and the rf ports associated with that cell controller. Since a cell controller is responsible for performing higher level Standard 802.11 MAC functions of the access points, a large number of rf ports may be serviced by a single cell controller, and failure of the cell controller can result in failure of the wireless data communications network over a relatively large area. In systems which use self sufficient access points to provide wireless access to a network, the failure of an access point does not necessarily result in system failure, since access points in adjoining physical location can continue to provide communications for a mobile unit which was communicating through the failed access point.

It is an object of the present invention to provide an improved method and apparatus for use in a system using a cell controller and rf port for providing wireless local area network communications.

SUMMARY OF THE INVENTION

In accordance with the invention there is provided a wireless local area network for data communications between a computer and at least one mobile unit. The network includes first and second cell controllers connected to the computer, for example, through a wired data communications network. There is provided at least one rf port connected to a primary interface of the first cell controller and to a backup interface of the second cell controller. The second cell controller includes a control program for monitoring data communications with the rf port via the backup interface. The program is arranged to cause the second cell controller to assume primary communications functions of the rf port in the event primary communications functions of the first cell controller are inoperative for communication with the rf port.

According to a preferred arrangement of the wireless local area network there may be provided at least one additional rf port which is connected to a primary interface of the second cell controller and to a backup interface of the first cell controller. In this arrangement the first cell controller also includes a control program for monitoring data communications with the additional rf port through its backup interface. The program is arranged to cause the first cell controller to assume primary communication functions of the additional rf port in the event primary communications function of the second cell controller are inoperative for communication with the additional rf port.

In one arrangement the control program monitors boot requests from the rf port and detects communication failure by repeated boot requests. The primary and backup interfaces of the cell controllers may be defined by the software of the cell controllers, which designates certain of its interfaces as being primary to that cell controller and others as being backup interfaces. When a communication failure occurs the cell controller control program may be arranged to communicate with the other cell controller and to determine if primary communications functions of the other cell controller have become operative. When the backup cell controller determines that the other cell controller has become operative and is capable of assuming primary communications with an rf port, the backup cell controller for the rf port can be arranged to send a reset signal to the rf port to cause it to send a boot request to it's primary cell controller.

In accordance with the invention there is provided a backup cell controller for use in a wireless local area network for data communications between a computer and at least one mobile unit. The backup cell controller includes at least one interface for connection to an rf port and a cell controller program for monitoring data communications from the rf port connected to the interface. The program is arranged to cause the backup cell controller to assume primary communications functions with the rf port in the event primary communications functions of another cell controller are inoperative for communications with the rf port.

The backup cell controller preferably includes an additional interface by which the backup cell controller may provide primary communications functions with an additional rf port connected to the additional interface. One way that the control program can monitor communications with an rf port is to monitor the boot requests and detect communications failure between an rf port and another cell controller by repeated boot requests from the rf port. The backup cell controller may be arranged to communicate with a primary cell controller following a determination of inoperative primary communications with an rf port to determine if primary communications have subsequently become operative. The backup cell controller can reset an rf port to cause it to reinitiate communications through it's primary cell controller.

In accordance with the invention there is provided a method for operating a wireless local area network for data communications between a computer and at least one mobile unit. There are provided first and second cell controllers connected to the computer, for example through a wired network. At least one rf port is connected to a primary interface of a first cell controller and connected to a backup interface of the second cell controller. The second cell controller monitors communications with the rf port by the backup interface and assumes primary communications with the rf port using the second cell controller in the event primary communications functions of the first controller are inoperative for communications with the rf port.

In a preferred arrangement there may be provided an additional rf port connected to a primary interface of the second cell controller and to a backup interface of the first cell controller. In this case the first cell controller monitors data communications with the additional rf port and causes the first cell controller to assume primary communications functions for the additional rf port in the event primary communications of the second cell controller are inoperative for communicating with the additional rf port. The monitoring may comprise monitoring boot requests from the additional rf port and detecting primary communications failure when the boot requests are repeated. Software may be used to define which interfaces of either cell controller comprise primary or backup interfaces. Following a determination of an inoperative primary communications there may be provided communications between the first and second cell controllers to determine if primary communications functions of the first cell controller have become operative. The rf port can be reset if the failed cell controller has been determined to be operative.

For a better understanding of the present invention, together with other and further objects, references made to the following description, taken in conjunction with the accompanying drawings, and its scope will be pointed out in the appended claims

DESCRIPTION OF A PREFERRED EMBODIMENT

Figure 1:
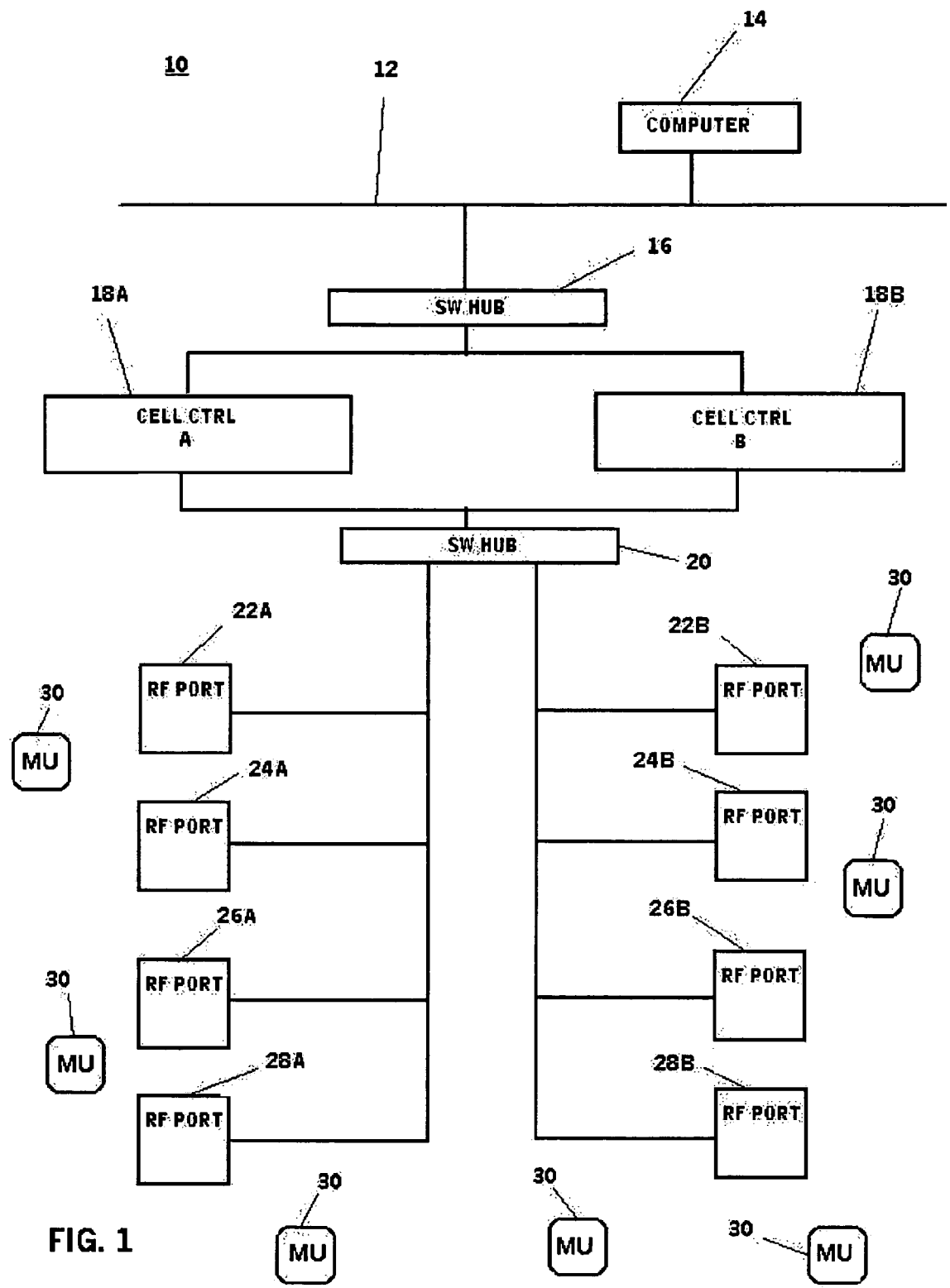
FIG. 1 is a block diagram illustrating an embodiment of a system using backup cell controllers in accordance with a preferred embodiment of the present invention.

Referring to FIG. 1 there is shown a system 10 for providing a wireless local area network according to a preferred arrangement of the present invention. The system 10 is used with a wired network 12 having at least one computer 14. Those skilled in the art will recognize that additional computers and other equipment, such as a wide area network interface, an internet interface or a PBX may also be coupled to network 12.

In the embodiment illustrated in FIG. 1, the wireless local area network 10 includes first and second cell controllers 18 labeled A and B and designated 18A and 18B. Cell controllers 18 are interfaced to network 12 by switching hub 16. As described in the referenced co-pending patent application, cell controllers 18A and 18B interface to network 12 and provide higher level medium access control (MAC) functions of an 802.11 wireless network, for example. The system 10 illustrated in FIG. 1 includes two cell controllers, but those skilled in the art will recognize that any number of such cell controllers may be provided. The cell controllers 18A and 18B are arranged to be in backup mode to each other as will be further described. In the embodiment illustrated in FIG. 1 cell controller 18A provides a hot standby backup for the rf ports serviced by cell controller 18B and cell controller 18B provides a hot standby backup for rf ports serviced by cell controller 18A.

Those skilled in the art will recognize that other arrangements of cell controllers are possible. For example, in a system having three cell controllers A, B and C, cell controller B may backup for cell controller A, cell controller C may backup for cell controller B and cell controller A may backup for cell controller C. Those skilled in the art will also recognize that it is possible to have a backup cell controller that does not have it's own rf ports associated with it and whose function is only to be in a hot standby backup condition for another cell controller. Cell controllers 18A and 18B are coupled by a common switching hub 20 to rf ports associated therewith. In the system 10 of FIG. 1 rf ports 22A, 24A, 26A and 28A are associated with cell controller 18A as their primary cell controller. Likewise, rf ports 22B, 24B, 26B and 28B are associated with cell controller B as their primary cell controller. The wireless local area network 10 of FIG. 1 may likewise include additional rf ports coupled to the cell controllers A, B and additional cell controllers. The illustrated embodiment shows four rf ports connected to each cell controller as a primary cell controller, but it will be recognized that there may be fewer or a larger number of rf ports allocated to each cell controller and the number of rf ports allocated to a cell controller may be different for each cell controller.

Rf ports 22, 24, 26, 28, A and B are arranged to form a wireless network for example within a facility, such as a hospital, industrial facility or university. Mobile units 30 may be arranged anywhere within the facility within range of an rf port and communicate with computer 14 over wireless network 10 and through wired network 12.

In accordance with a preferred arrangement of the present invention, rf ports 22A, 24A, 26A and 28A are connected to a primary interface of cell controller 18A. In this connection, the interface may be a software interface designating the particular interface with the rf port as being a primary rf port.

By designation of the interface with rf ports 22A, 24A, 26A and 28A, cell controller 18A primarily acts when it receives a boot request from any of these rf ports and thereafter boots or downloads a program to the rf port sending the boot request to initiate its operation. Likewise, rf ports 22B, 24B, 26B and 28B are primarily associated with cell controller B and have a primary interface therewith. Accordingly cell controller B initially responds to boot requests from its associated rf ports to download software to them.

All of the rf ports of the system 10 of FIG. 1, in addition to being connected to a primary interface of their associated cell controllers, are also connected to a backup interface of the other cell controller. Thus, for example, rf port 22A is connected to a primary interface of cell controller 18A and to a backup interface of cell controller 18B. Cell controllers 18A and 18B are provided with a control program to provide backup in the event of a failure of the other cell controller. For example, if cell controller 18A fails to operate, its corresponding rf port 22A will send a boot request message and not receive the requested initiation data. Rf port 22A, after a selected time period, such as one minute, will send a further boot request to cell controller 18A and continue to do so until cell controller 18A or another cell controller responds. Cell controller 18B monitors the boot requests from rf port 22A through the backup interface with rf port 22A. Cell controller 18B in a preferred arrangement keeps a count of the number of boot requests from an rf port. Thus, for example, if rf port 22A sends three or five boot request messages, then cell controller 18B may assume that cell controller 18A is inoperative, in that it cannot respond to the boot request from rf port 22A. In this case, cell controller 18B provides a backup for rf port 22A by downloading a boot program to rf port 22A that causes rf port 22A to become associated with cell controller 18B as a backup cell controller on a temporary basis. Cell controller 18B will likewise respond to boot requests from rf ports 24A, 26A and 28A in order to backup the failure of cell controller 18A. Likewise, cell controller 18A will backup the operation of cell controller 18B and monitor the boot request from rf ports 22B, 24B, 26B and 28B and provide a downloaded boot program to those cell controllers to initiate backup operation in the event a predetermined number of repetitive boot requests are received from any of those rf ports. Once a cell controller 18 has initiated backup operation for rf ports primarily associated with a different cell controller, the operation of the rf ports for communication with mobile units may proceed normally, subject to increased traffic which may slow down the operation of that particular cell controller. In a preferred arrangement once a cell controller has assumed operation as a backup cell controller for rf ports which are primarily associated with a different cell controller it will send inquiry messages to the cell controller primarily responsible for the rf ports to determine if that cell controller has resumed operation. Such inquiry messages may be sent, for example, every three to five minutes. When a cell controller providing backup service for rf ports primarily associated with a different cell controller determines that the other cell controller has become operational, as a result of receiving an appropriate response to an inquiry message, it can then send a reset signal to the rf ports for which it is providing backup service. The reset signal causes the rf ports to reinitiate the boot process by sending a boot request to their primary cell controller, which, if operative, will download the appropriate software. In the event the primary cell controller is still not operational to provide the primary software to the requesting rf ports, the backup cell controller monitors the boot request and may again assume backup operation for such rf ports.

Those skilled in the art will recognize that other modes of operation are possible than those specifically described above. For example a cell controller may determine malfunction in another cell controller by monitoring signals from the other cell controller and thereby not monitor the boot request from the rf ports. In addition a cell controller may determine that a different cell controller has become operational when it receives valid communications from the other cell controller.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

The invention claimed is:

1. A wireless local area network for data communications between a computer and at least one mobile unit, comprising:
    first and second cell controllers connected to said computer;
    at least one rf port connected to a primary interface of said first cell controller and connected to a back-up interface of said second cell controller; and
    a control program in said second cell controller monitoring data communications with said at least one rf port via said back-up interface, said program being arranged to cause said second cell controller to assume primary communications functions with said at least one rf port in the event primary communications functions of said first cell controller are inoperative for communication with said at least one rf port, wherein said control program monitors boot requests from said at least one rf port and detects communication failure by repeated boot requests.

2. A network as specified in claim 1 wherein there is provided at least one additional rf port connected to a primary interface of said second cell controller and to a back-up interface of said first cell controller, and wherein said first cell controller includes a control program for monitoring data communications with said additional rf port via said back-up interface of said first cell controller, said program being arranged to cause said first cell controller to assume primary communications functions of said additional rf port in the event primary communications functions of said second cell controller are inoperative for communication with said additional rf port.

3. A network as specified in claim 1 wherein said primary and back-up interfaces are defined by software of said cell controllers.

4. A network as specified in claim 1 wherein said second cell controller control program is arranged to communicate with said first cell controller following a determination of inoperative primary communications to determine if primary communications functions of said first cell controller have become operative.

5. A network as specified in claim 4 wherein said second cell controller program is arranged to reset said at least one rf port when said first cell controller's primary communications functions are determined to be operative.

6. A back-up cell controller for use in a wireless local area network for data communications between a computer and at least one mobile unit, comprising:
    at least one interface for connection to an rf port; and
    a cell controller program monitoring data communications from an rf port connected to said interface, said program being arranged to cause said back-up cell controller to assume primary communications functions with said rf port in the event primary communications functions of another cell controller are inoperative for communication with said rf port, wherein said cell controller program monitors boot requests from the rf port and detects communication failure by repeated boot requests.

7. A back-up cell controller as specified in claim 6 wherein said cell controller includes at least one additional interface, said additional interface and said control program being arranged to provide primary communications functions with an additional rf port connected to said additional interface.

8. A back-up cell controller as specified in claim 6 wherein said cell controller control program is arranged to communicate with another cell controller following a determination of inoperative primary communications with said rf port to determine if primary communications functions have become operative.

9. A back-up cell controller as specified in claim 8 wherein said cell controller program is arranged to reset said rf port if said primary communications are determined to be operative.

10. A method for operating a wireless local area network for data communications between a computer and at least one mobile unit, comprising:

providing first and second cell controllers connected to said computer;

providing at least one rf port connected to a primary interface of said first cell controller and connected to a back-up interface of said second cell controller; and monitoring data communications using said second cell controller with said at least one rf port via said back-up interface, and assuming primary communications with said at least on rf port using said second cell controller in the event primary communications functions of said first cell controller are inoperative for communication with said at least one rf port wherein said monitoring step includes monitoring boot requests from said at least one rf port and detecting that primary communications is inoperative based on repeated boot requests.

11. A method as specified in claim 10 wherein there is provided at least one additional rf port connected to a primary interface of said second cell controller and to a back-up interface of said first cell controller, further including monitoring data communications with said additional rf port via said back-up interface of said first cell controller, and causing said first cell controller to assume primary communications functions of said additional rf port in the event primary communications functions of said second cell controller are inoperative for communication with said additional rf port.

12. A method as specified in claim 10 further including defining said primary and back-up interfaces using software in said cell controllers.

13. A method as specified in claim 10 further including communicating between said first and second first cell controllers following a determination of inoperative primary communications, to determine if primary communications functions of said first cell controller have become operative.

14. A method as specified in claim 13 further including resetting said at least one rf port if said first cell controller primary communications are determined to be operative.

* * * * *

UNITED STATES PATENT AND TRADEMARK OFFICE
CERTIFICATE OF CORRECTION

PATENT NO.         : 7,376,079 B2                                      Page 1 of 1
APPLICATION NO.  : 10/856156
DATED              : May 20, 2008
INVENTOR(S)        : John Klein It is certified that error appears in the above-identified patent and that said Letters Patent is hereby corrected as shown below:

Col. 7, Line 9 claim 10 "on" should be changed to --one--.

Signed and Sealed this

Seventh Day of October, 2008

JON W. DUDAS
*Director of the United States Patent and Trademark Office*